(12) United States Patent
Crow et al.

(10) Patent No.: US 10,692,026 B2
(45) Date of Patent: Jun. 23, 2020

(54) SYSTEM, APPARATUS, AND METHOD FOR GENERATING ELEMENTARY STAFFING SCHEDULES

(71) Applicant: Education Advanced, Inc., Tyler, TX (US)

(72) Inventors: J. Eli Crow, Tyler, TX (US); Kenneth L. Sikes, Tyler, TX (US); Shawn M. Rasure, Tyler, TX (US)

(73) Assignee: Education Advanced, Inc., Tyler, TX (US)

( * ) Notice: Subject to any disclaimer, the term of this patent is extended or adjusted under 35 U.S.C. 154(b) by 0 days.

(21) Appl. No.: 16/041,358

(22) Filed: Jul. 20, 2018

(65) Prior Publication Data
US 2020/0027053 A1    Jan. 23, 2020

(51) Int. Cl.
*G06Q 10/06* (2012.01)
*G06Q 50/20* (2012.01)

(52) U.S. Cl.
CPC ........... *G06Q 10/063116* (2013.01); *G06Q 10/063112* (2013.01); *G06Q 50/205* (2013.01)

(58) Field of Classification Search
CPC ... G06Q 10/063116; G06Q 10/063112; G06Q 50/205
USPC ........................................................ 705/7.16
See application file for complete search history.

(56) References Cited

U.S. PATENT DOCUMENTS

| | | | | |
|---|---|---|---|---|
| 5,270,920 A | * | 12/1993 | Pearse | G06Q 10/06 705/7.16 |
| 10,115,065 B1 | * | 10/2018 | Fama | G06Q 10/063116 |
| 2004/0110119 A1 | * | 6/2004 | Riconda | G09B 7/02 434/350 |
| 2004/0193473 A1 | * | 9/2004 | Robertson | G06Q 10/04 705/7.16 |
| 2005/0055256 A1 | * | 3/2005 | Scott | G06Q 10/10 705/321 |
| 2006/0105315 A1 | * | 5/2006 | Shaver | G06Q 10/02 434/362 |
| 2008/0050715 A1 | * | 2/2008 | Golczewski | G06Q 10/06311 434/350 |
| 2011/0047224 A1 | * | 2/2011 | Fox | G09B 7/02 709/206 |

(Continued)

OTHER PUBLICATIONS

Cardenas, Heidi. "Formula for Calculating Staffing Needs." Small Business—Chron.com, http://smallbusiness.chron.com/formula-calculating-staffing-needs-12759.html. Jul. 19, 2017. (Year: 2017).*

(Continued)

*Primary Examiner* — Folashade Anderson (57) ABSTRACT

Disclosed herein are aspects of a staff scheduling system for preparing a staffing schedule report for at least one elementary education campus of a school district. In one embodiment, a staff scheduler comprises at least one interface for receiving a plurality of inputs from at least one external computing device; and a processor configured to perform a staff scheduling algorithm to generate a staffing schedule report for each of the elementary education campuses, wherein the staff scheduling algorithm generates a series of input prompts and decisions based on the plurality of inputs. The plurality of inputs may include at least student data, teacher data, enrollment data, and required minutes per course per week.

19 Claims, 7 Drawing Sheets

(56) References Cited

U.S. PATENT DOCUMENTS

2013/0022953 A1* 1/2013 van der Linden ....... G09B 7/02
　　　　　　　　　　　　　　　　　　　　　434/322
2017/0357759 A1* 12/2017 Stepaniuk .............. G16H 10/60
2019/0080296 A1* 3/2019 Crow ................. G06Q 10/1093

OTHER PUBLICATIONS

Ernst et al "Staff scheduling and rostering: A review of application, methods and models." Eurpoen Journal of Operational Research. vol. 153, Iss. 1, Feb. 16, 2004, pp. 3-27 (Year: 2004).*

* cited by examiner

STAFF ANALYSIS REPORT
H L HIGGINS ELEMENTARY SCHOOL

| DEPT | CATEGORY | CURRENT #TEACHERS | NEXT YR ENROLL | CALCULATED #NEEDED TEACHERS | TARGET #TEACHERS | TARGET AVG CLASS | ANALYSIS |
|---|---|---|---|---|---|---|---|
| CORE ELEM | 1st GRADE | 5 | 96 | 4.8 | 5 | 19.2 | |
| CORE ELEM | 2nd GRADE | 7 | 124 | 6.2 | 6.5 | 19.1 | |
| CORE ELEM | 3rd GRADE | 5 | 101 | 5.1 | 5.5 | 18.4 | |
| CORE ELEM | 4th GRADE | 6 | 105 | 5.3 | 5.5 | 19.1 | |
| CORE ELEM | 5th GRADE | 6 | 116 | 4.6 | 5 | 23.2 | |
| TOTAL CORE LEVEL | | 29 | | 26 | 27.5 | | |
| ELEM REQUIRED SPECIALS | MUSIC | 2 | 542 | 1 | 1 | 542 | |
| ELEM REQUIRED SPECIALS | PHYS ED | 1 | 542 | 1 | 1 | 542 | |
| ELEM REQUIRED SPECIALS | TECHNOLOGY | 1 | 542 | 1 | 1 | 542 | |
| ELEM REQUIRED SPECIALS | LIBRARY | 1 | 542 | 1 | 1 | 542 | |
| TOTAL SPECIALS | | 5 | | 4 | 4 | | |
| ELEM SPECIAL PROGRAMS | SPEC ED | 3 | 542 | 0 | 0 | 0 | |
| ELEM SPECIAL PROGRAMS | OTHER ASSIGNMENTS | 4 | 542 | 0 | 0 | 0 | |
| ELEM SPECIAL PROGRAMS | ESL/ BIL | 0 | 542 | 0 | 0 | 0 | |
| ELEM SPECIAL PROGRAMS | PARAPROFESSIONAL | 13 | 542 | 0 | 0 | 0 | |
| ELEM SPECIAL PROGRAMS | RTI/ DYSLEXIA | 4 | 542 | 0 | 0 | 0 | |
| CAMPUS TOTALS | | 58 | | 34 | 35.5 | | |

SYSTEM, APPARATUS, AND METHOD FOR GENERATING ELEMENTARY STAFFING SCHEDULES

TECHNICAL FIELD

This disclosure relates to staffing schedules and, more specifically, creating an optimal schedule for staffing for elementary education facilities based on a plurality of inputs.

BACKGROUND

School districts are required to maintain a certain student to staff ratio, provide certain required courses, while remaining within budgets for their district. At elementary school campuses, there are generally classroom teachers; "specials" teachers, such as, music, art, physical education, library, and other teachers; and also instructional specialists, such as gifted and talented, reading specialist, English as a Second Language (ESL), and other special instructors. There may, in some campuses, be special education instructors for students with learning or physical disabilities requiring specially designed instruction. Determining staffing for the elementary education campuses can be challenging for districts as enrollment fluctuates. What is needed is a system for determining staffing requirements for elementary education campuses.

SUMMARY

Disclosed herein are aspects of a staff scheduling system for preparing a staffing schedule report for at least one elementary education campus of a school district. In one embodiment, the staff scheduler includes: at least one interface for receiving a plurality of inputs from at least one external computing device; and a processor configured to perform a staff scheduling algorithm to generate a staffing schedule report for each of the at least one elementary education campuses, wherein the staff scheduling algorithm generates a series of input prompts and decisions based on the plurality of inputs. The plurality of inputs may include at least student data, teacher data, enrollment data, required minutes of core teaching, and required minutes per specials course.

In another aspect, the disclosure provides a staff scheduling system for at least one elementary education campus for a school district. In one embodiment, the staff scheduling system includes: a staff scheduler configured to generate a staff schedule report; and at least one external computing device configured to supply course and teacher data to the staff scheduler for the staff schedule. The staff scheduler includes: at least one interface for receiving a plurality of inputs from the at least one external computing device; a memory, the memory storing a staff scheduling computer program product; and a processor configured to execute a staff scheduling algorithm and prepare based thereon a staffing schedule report for the at least one elementary education campus, wherein the staff scheduling algorithm generates a series of input prompts and decisions based on the plurality of inputs; wherein the plurality of inputs includes at least student data, teacher data, enrollment data, required minutes of core teaching, and required minutes per specials course.

In yet another aspect, the disclosure provides a method for preparing a staffing schedule report for elementary education campus of a school district. In one embodiment, the method includes: at least receiving data for the elementary education campus from at least one external source, the data including at least student data, teacher data, enrollment data, and required minutes per course per week, and preparing a staffing schedule report for the elementary education campus using the received data, wherein the preparing the staffing schedule report is performed by a processor and satisfies conditions indicated by the received data.

BRIEF DESCRIPTION

Reference is now made to the following descriptions taken in conjunction with the accompanying drawings, in which.

DETAILED DESCRIPTION

Each school district must determine staffing needs each year as enrollment fluctuates, state requirements change, and teaching curriculums and benchmarks fluctuate. Certain courses and subjects are required for each student, and in addition to required/core content courses, at the elementary level, students may also take "specials" or non-core content classes. Teachers may have a variety of certifications and specialties, and certain teachers may lack some of the certifications or skills to teach certain grade levels or "special" classes. As enrollment and state requirements fluctuate, school districts and individual elementary education campuses within the district may re-evaluate staffing needs and schedules each year.

Accordingly, the disclosure provides a staff scheduling system for providing an elementary staffing schedule report for each campus based on inputs received. The inputs may come from, for example, at least one user at each campus and/or a district administrator, data received from a school district management system, and data from external sources. The inputs considered in generating an elementary staffing schedule report include at least a current number of enrolled students, projected enrollment changes, core-content teachers' availability and consideration of each teacher's experience and certifications, "specials" (non-core content) teachers' availability and each specials teacher certifications, desired average class size, enrollment factor—desired ratio of students per teacher per class, number of minutes each student must take for certain classes, whether or not teachers are shared with one or more other campuses, teacher aides available, a ratio of students to teachers allowed, and other factors which may vary according to each state and individual school district.

Each state also has a required number of minutes that teachers must have for non-teaching and break time, such as conference time, lunch breaks, planning time, and similar non-teaching time that teachers must have each day. For example, in Texas, elementary teachers must have at least 450 minutes of conference or planning time over a 10 day period and at least 30 minutes for lunch/break each day. This required non-teaching time is considered in a teacher's available minutes per day.

General definitions and information discussed in more detail and/or referenced in the specification below include the following information. "Specials" teachers are generally non-core content or not a grade-level self-contained teacher, such as, physical education (PE), Music, Art, Technology, library, and other non-core content subjects. Core content teachers are generally grade-level specific teachers, responsible for teaching grade-level specific content, such as math, reading, science, language arts, social studies, writing, and other content taught according to grade level and in some cases, tested on standardized testing for the state. Each state dictates the number or minutes each student must take certain courses, given in number of minutes per week. An enrollment factor is the ideal ratio of students per teacher, determined by either the school district or individual campus. Average class size is the desired class size in order to achieve the state minimum student-teacher ratio.

For "specials" or non-core classes, each state requires a certain number of minutes per week per child. For example, in Texas, students are required to have 135 minutes per week of physical education and/or fitness.

An elementary staff scheduling system according to the disclosure may include a computer program product configured to prepare an elementary staffing schedule according to details of the disclosure. A staff scheduler apparatus and method for conducting staffing scheduling are also provided. The staff scheduling system may include at least one user interface where one or more users can input various inputs to be considered in the preparation of a staffing schedule. The inputs may include inputs from a user at each campus and/or one or more district administrators.

The staff scheduling system may also include external data sources. A data management system at a school district level may be connected with the staff scheduler to provide data via automated inputs and updates. The data which may be automatically updated may include student data—students enrolled and their individual identification data; teacher data; teacher qualifications—which courses each teacher is qualified to teach; and other information pertinent to elementary staff schedules.

The disclosure advantageously improves the computer technology area of elementary staff scheduling by allowing a computer to perform a function previously not performable by a computer: generate an elementary staffing schedule by considering and weighing the plurality of inputs as disclosed herein. As provided below, the disclosure provides specific implementations for generating elementary staff schedules and determining staffing levels for each campus. The disclosed systems and methods can also be used to determine a target number of specials teachers for multiple campuses. This advantageously allows sharing of a specials teacher between campuses when determining a specials teacher's available minutes are not filled by a single campus. The physical distance between campuses or travel time there between can be an additional factor used to determining the sharing of a specials teacher.

Figure 1:
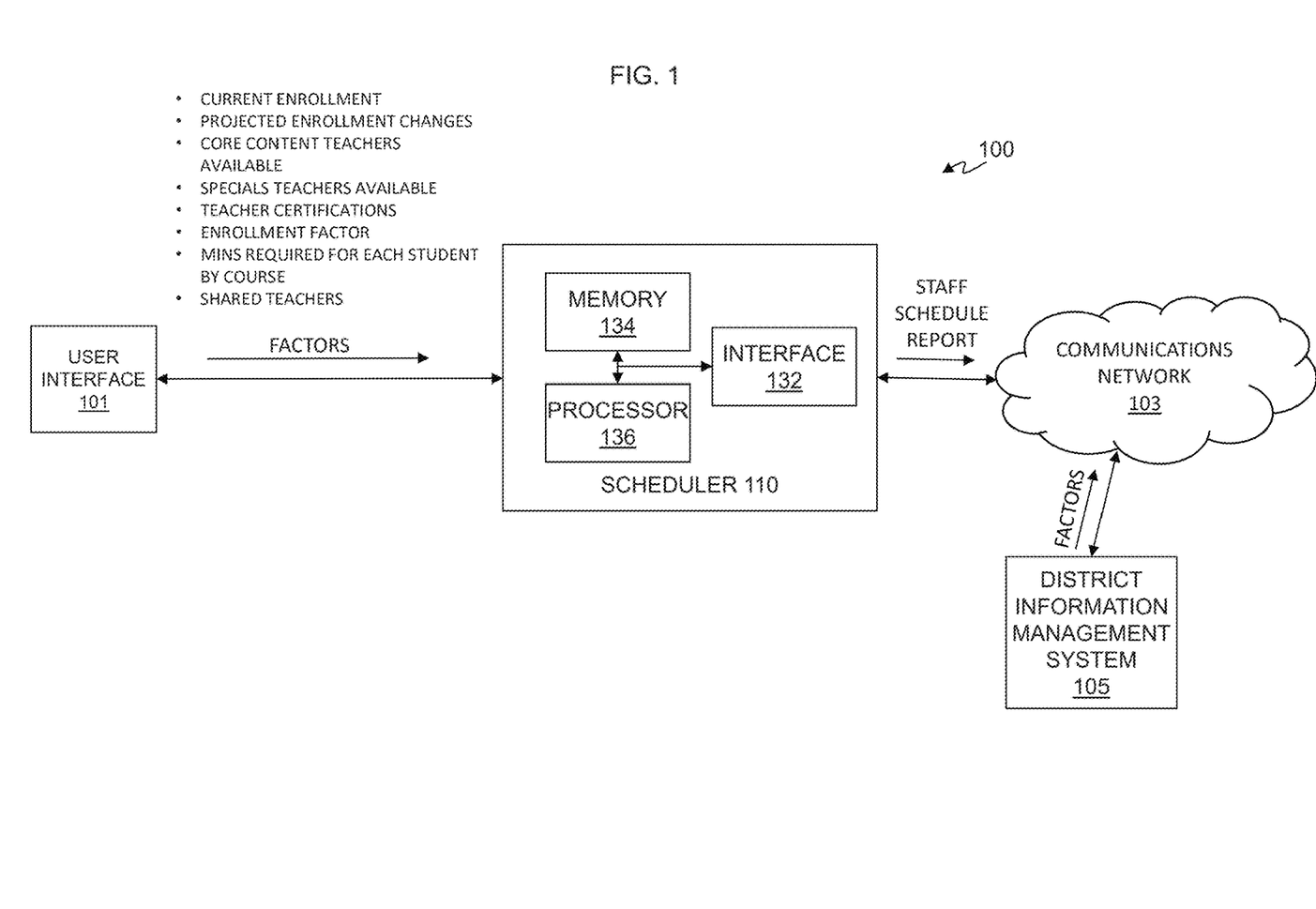
FIG. 1 illustrates a diagram of an embodiment of a staff scheduling system for creating a staffing schedule report for elementary school campuses for a school district carried out according to the principles of the disclosure.

Turning now to the figures, FIG. 1 illustrates a diagram of an embodiment of a staff scheduling system 100 constructed according to the principles of the disclosure. The staff scheduling system 100 is configured to allow at least one user, such as a scheduling coordinator or other administrative/data entry personnel to input a plurality of factors that impact the staffing schedule for a school district and elementary education campuses of the school district. The staff scheduling system 100 includes a staff scheduler 110 connected with at least one user interface 101 for entering a plurality of staffing factors into the staff scheduler 110. The system 100 may also include a communications interface 132 for connecting the staff scheduler 110 with a district information management system 105 or other external computing sources, which may provide staffing factors and updates, in some embodiments automatically, to the staff scheduler 110. Thus, the staff scheduler 110 can receive staffing factors from both the user interface 101 and the district information management system 105. The district information management system 105 is connected to the staff scheduler 110 via a communications network 103, such as the internet. The user interface 101 can also be connected to the staff scheduler 110 via the communications network.

The user interface 101 is configured to receive a plurality of data and information which are considered when determining a staffing schedule. The user interface 101 may include one or more computer devices configured to communicate with the staff scheduler 110. The user interface 101 may be a conventional communication device such as a smart phone, a tablet, a pad, a laptop, a desktop, or another device capable of interfacing with a user and communicating via wireless connections, wired connections or a combination thereof. The user interface 101 may also be a web-based interface provided by the state or individual school district which may then be accessed at each campus. After scheduling factor data is entered by the user(s), the user interface 101 thereafter communicates the data to the staff scheduler 110 for consideration in the production of the staffing schedule.

The staff scheduler 110 may be a separate computing device apart from the user interface 101, or in some embodiments may be incorporated into the same computing device or computing system as the user interface 101. In some embodiments, the staff scheduler 110 may be housed on a network at either each campus, district, or state level. In one embodiment, the staff scheduler 110 is implemented on a server that includes the necessary logic and memory to perform the functions disclosed herein. Accordingly, the staff scheduler 110 can also be a website hosted on a web server, or servers, and that is accessible via the World Wide Web. A Uniform Resource Locator (URL) can be used to access the various webpages of the staff scheduler 110. In some embodiments, the staff scheduler 110 can be implemented as a Software as a Service (SaaS).

The staff scheduler 110 may include at least one interface, for example the communications interface 132, a memory 134 and a processor 136. The communications interface 132 is a component or device interface configured to couple the staff scheduler 110 to the user interface 101 and communicate therewith. The communications interface 132 may also be configured to connect the staff scheduler 110 with the district information management system 105 and any other external data sources, or in some embodiments, a second interface may be required. The communications interface 132 can be a conventional interface that communicates with the user interface 101 and district information management system 105 according to standard protocols. The communications network 103 can be a conventional communications network that also communicates via standard protocols.

The memory 134 is configured to store a series of operating instructions that direct the operation of the processor 136 when initiated, including the code representing the algorithms for staff scheduling. The memory 134 is a non-transitory computer readable medium. The memory 134 can be the memory of a server.

The processor 136 is configured to direct the operation of the staff scheduler 110. As such, the processor 136 includes the necessary logic to communicate with the interface 132 and the memory 134 and perform the functions described herein to prepare a staffing schedule report based on the plurality of inputs received by the staff scheduler 110. The processor 136 can be part of a server. The staffing schedule report can be communicated to the district information management system 105. In some embodiments, the staffing schedule report can be communicated to the user interface 101.

Figure 2:
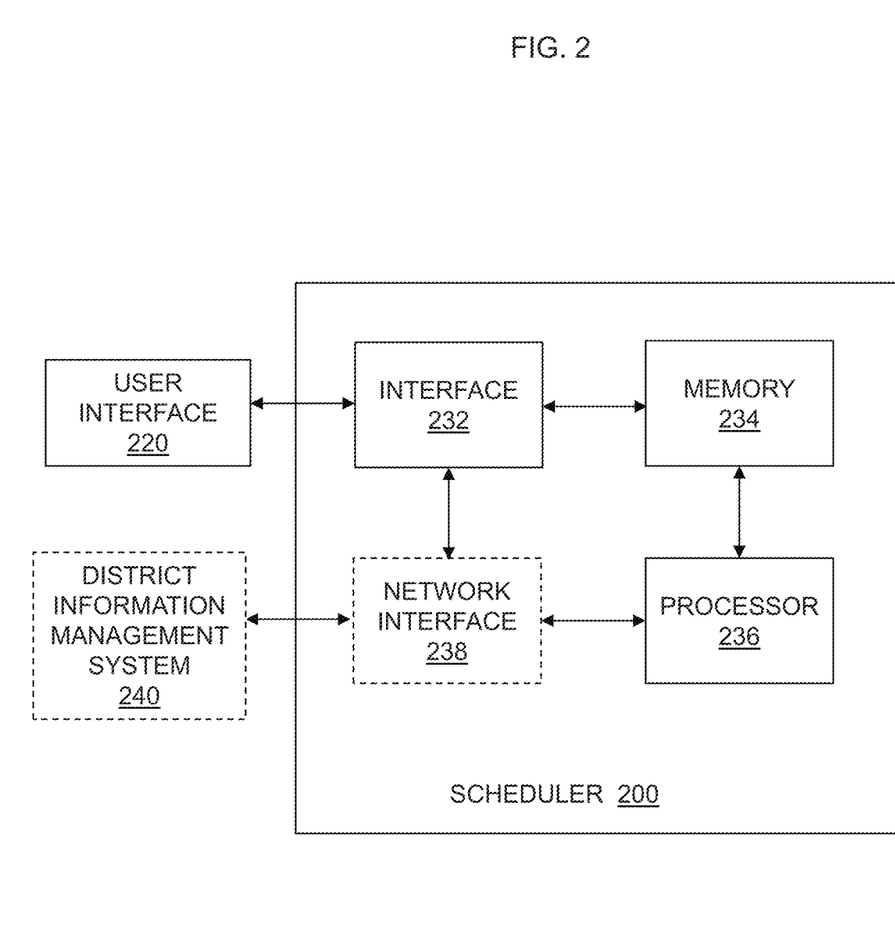
FIG. 2 illustrates a block diagram of one embodiment of a staff scheduler constructed according to the principles of the disclosure.

FIG. 2 illustrates a block diagram of an embodiment of a staff scheduler 200 constructed according to the principles of the disclosure. The staff scheduler 200 or at least a portion thereof can be embodied as a series of operating instructions stored on a non-transitory computer-readable medium that direct the operation of a processor when initiated. The staff scheduler 200 can be stored on a single computer or on multiple computers. The various components of the staff scheduler 200 can communicate via wireless or wired conventional connections. A portion of the staff scheduler 200 can be located on a server and other portions of the staff scheduler 200 can be located on a computing device or devices that are connected to the server via a network or networks.

The staff scheduler 200 can be configured to perform the various functions disclosed herein including receiving inputs from a user interface, from a district information management system, and inputs which may be stored in a memory, and can consider all of the received inputs in order to prepare a staffing schedule report by course for elementary education campuses in each district, including courses and staffing which will be shared by multiple campuses in the district. In some embodiments, the staffing schedule report can be for all of the school campuses. The detailed schedule report may provide at least a number of scheduled course sections, a number of teacher sections by course, and an analysis regarding whether the course is under or over staffed. In some embodiments, the courses may be grouped by department, and in yet other embodiments, the courses may be grouped by category.

In one embodiment, at least a portion of the staff scheduler 200 is a computer program product. The staff scheduler 200 includes staff scheduling code, a memory, and may include a network interface. The staff scheduler 200 is also communicatively coupled to at least one user interface 220.

The at least one user interface 220 is configured to receive inputs from one or more users at one or more elementary education campuses or one or more district administrators. The at least one user interface 220 or at least a portion thereof can be provided on a display or screen of user devices to allow interaction between users and the staff scheduler 200. In one embodiment, the at least one user interface 220 includes a web page provided on a user device. The interaction via the user interface 220 includes manual entry of certain data points. A keyboard, keypad, mouse, or other input device can be used for entering the data points.

Some data points may stay substantially constant, such as district information, campus information, and campus room information and facility layout, specials courses required, specials minutes required, core content minutes required, course requirements, and as such, may not require a substantial amount of data entry beyond an initial setup, except as required for updates and the like.

Other data points may not be constant, such as student information, including grade level, demographics, special accommodations required, if any; non-core "specials" courses and staff available at each campus; teacher information, including teacher data, courses and subjects qualified to teach, certifications; current staffing levels; and course enrollment requirements, including minimum class size, maximum class size, and a target average class size; and various other additional inputs which may require more substantial data entry, either into the at least one user interface, or into a school district information management system.

The interface 232, a communications interface, is a component or device interface configured to couple the staff scheduler 200 to the at least one user interface 220 and communicate therewith. The interface 232 may also be configured to connect the staff scheduler 200 with a district information management system 240, or in some embodiments, a second interface, such as network interface 238 may be included. The interface 232 and second interface 238 may each be a conventional interface that communicates with the user interface 220 and district information management system 240 according to standard protocols.

The memory 234 is configured to store a series of operating instructions that direct the operation of the processor 236 when initiated, including the code representing the algorithms for staff scheduling. The memory 234 is a non-transitory computer readable medium. The memory 234 can be the memory of a server.

The processor 236 is configured to direct the operation of the staff scheduler 200. As such, the processor 236 includes the necessary logic to communicate with the interface 232, second interface 238, and the memory 234 and perform the functions described herein to prepare a staffing schedule report based on the plurality of inputs received by the staff scheduler 200. The processor 236 can be part of a server.

Figure 3:
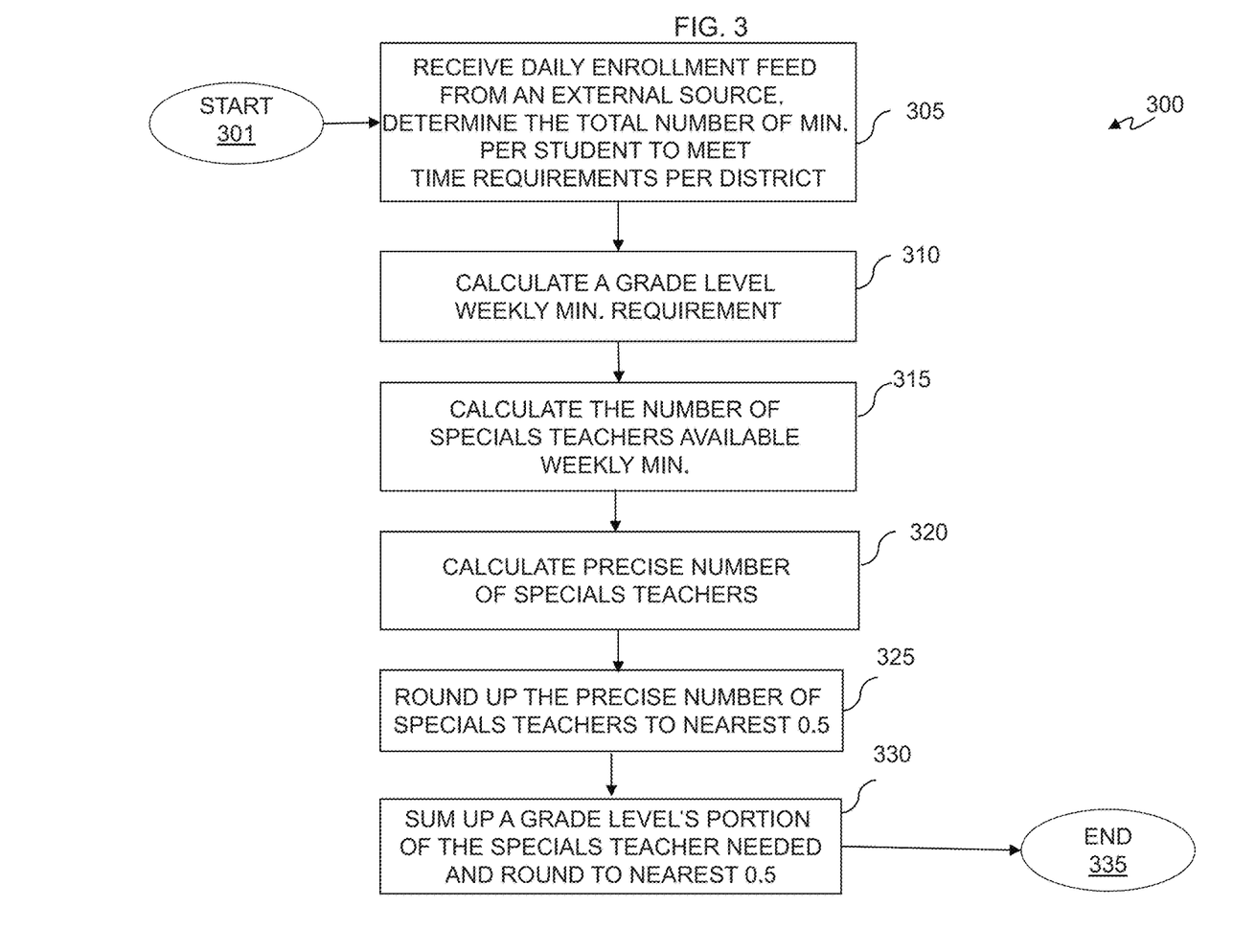
FIG. 3 illustrates a flow diagram of an embodiment of a method for determining a number of "specials" teachers needed to meet students' time requirements along with a predicted class size, the method carried out according to the principles of the disclosure.

Turning now to FIG. 3, there is illustrated a method 300 which may be used for determining a number of "specials" teachers required for each elementary education campus according to principles of the disclosure. The method 300 corresponds to an algorithm that can be executed by a processor, such as processor 236. The algorithm begins by determining a number of "specials" teachers needed to meet students' time requirements along with a predicted class size according to the principles of the disclosure. Time data includes the time requirements, such as for students per course, and available time, such as available number of minutes for a specials teacher per day. The following equation, Equation 1, will be described in more detail, as various steps are performed through the method 300.

$$\frac{\text{Core Teacher}}{\text{Grade}} \times \frac{\text{Students}}{\text{Core Teacher}} \times \quad \text{Equation 1}$$

-continued $$\frac{\text{Specials Minutes Available}}{\text{Day}} \times \frac{\text{Days Available}}{\text{Week}} \times$$

$$\frac{\text{Day}}{\text{Specials Minutes Available}} \times \frac{\text{Week}}{\text{Days Available}} \times$$

$$\frac{\text{Specials Teacher}}{\text{Students}} = \frac{\text{Specials Teacher}}{\text{Grade}}$$

Wherein $\frac{\text{Students}}{\text{Core Teacher}}$ = Enrollment Factor

In one embodiment, at least a portion of the method 300 can be performed by a computing device or processor as disclosed herein. A computing device may include the necessary logic circuitry to carry out at least a portion of the method 300. In one embodiment, the method 300 or at least a portion thereof may be embodied as a series of operating instructions that are stored on a non-transitory computer readable medium and used to direct the operation of a processor when initiated thereby. As indicated below, a staff scheduler as disclosed herein can perform at least some of the steps of the method 300. The method 300 begins in a step 301.

At a step 305, the scheduler receives a daily enrollment feed from an external source, such as a district management system, and determines the total number of minutes per student necessary to meet time requirements per district. In a step 310, the scheduler calculates a grade level weekly minutes requirement by multiplying the number of core teachers per grade by the enrollment factor (number of students per core teacher) by the number of minutes each student requires for each "specials" class each week. The steps 305 and 310 are represented by the following portion of Equation 1: Equation portion A:

$$\frac{\text{Core Teacher}}{\text{Grade}} \times \frac{\text{Students}}{\text{Core Teacher}} \times$$

$$\frac{\text{Specials Minutes Available}}{\text{Day}} \times \frac{\text{Days Available}}{\text{Week}}$$

The method continues is step 315, when the scheduler calculates the number of specials teachers available weekly minutes by multiplying the number of minutes available for the specials teacher per day by the number of days the specials teacher is available for classes, by the specials enrollment factor on the campus. The step 315 is represented by the following portion of Equation 1: Equation portion B:

$$\frac{\text{Day}}{\text{Specials Minutes Available}} \times \frac{\text{Week}}{\text{Days Available}} \times \frac{\text{Specials Teacher}}{\text{Students}}$$

The method continues in a step 320, the scheduler calculates a precise number of specials teachers by dividing grade level weekly minutes requirement by the specials teacher available weekly minutes. Step 320 is represented by the following Equation 2:

$$\frac{\frac{\text{Core Teacher}}{\text{Grade}} \times \frac{\text{Students}}{\text{Core Teacher}} \times \frac{\text{Specials Minutes Available}}{\text{Day}} \times \frac{\text{Days Available}}{\text{Week}}}{\frac{\text{Day}}{\text{Specials Minutes Available}} \times \frac{\text{Week}}{\text{Days Available}} \times \frac{\text{Specials Teacher}}{\text{Students}}}$$

The method continues in a step 325, when the scheduler rounds up quotient, the calculated precise number of specials teachers, to the nearest five tenths (0.5).

The method continues in a step 330 by summing up a grade level's portion of the specials teacher needed to meet the needs of the students for the entire elementary education campus, and then rounds up the sum to the nearest 0.5. The step 325 is represented by the following Equation 3:

$$\sum \frac{\text{Specials Teacher}}{\text{Grade}}$$

The method 300 ends at step 335.

Figure 4:
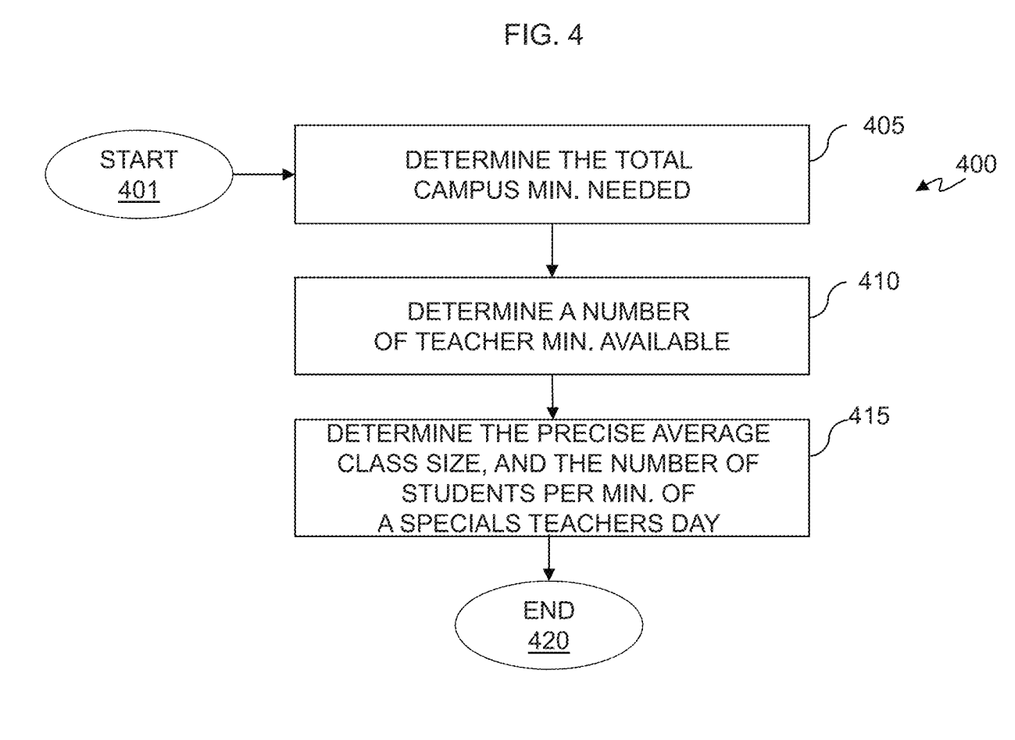
FIG. 4 illustrates a flow diagram of an embodiment of a method for determining a number of teachers possible with the predicted class size carried out according to the principles of the disclosure.

FIG. 4 illustrates a flow diagram of an embodiment of a method 400 for determining a number of teachers possible with the predicted class size according to the principles of the disclosure. The method 400 corresponds to an algorithm that can be executed by a processor, such as processor 236. The method begins at step 401.

At a step 405, the scheduler determines the total campus minutes needed by summing the grade level weekly requirements for each grade.

At a step 410, the scheduler determines a number of teacher minutes available by multiply the precise number of specials teachers by the minutes available to each teacher each day by the enrollment factor by number of days available each week.

In a step 415, the scheduler divide the total campus minutes needed by the precise teacher available minutes to determine the precise average class size, and the number of students per minute of a specials teachers day.

The calculations in Steps 405 through 415 are represented by the following Equation 4:

$$\frac{\frac{\text{Core Teacher}}{\text{Grade}} \times \frac{\text{Students}}{\text{Core Teacher}} \times \frac{\text{Specials Minutes Available}}{\text{Day}} \times \frac{\text{Days Available}}{\text{Week}}}{\sum \frac{\text{Specials Teacher}}{\text{Grade}}}$$

The method ends at step 420.

Figure 5:
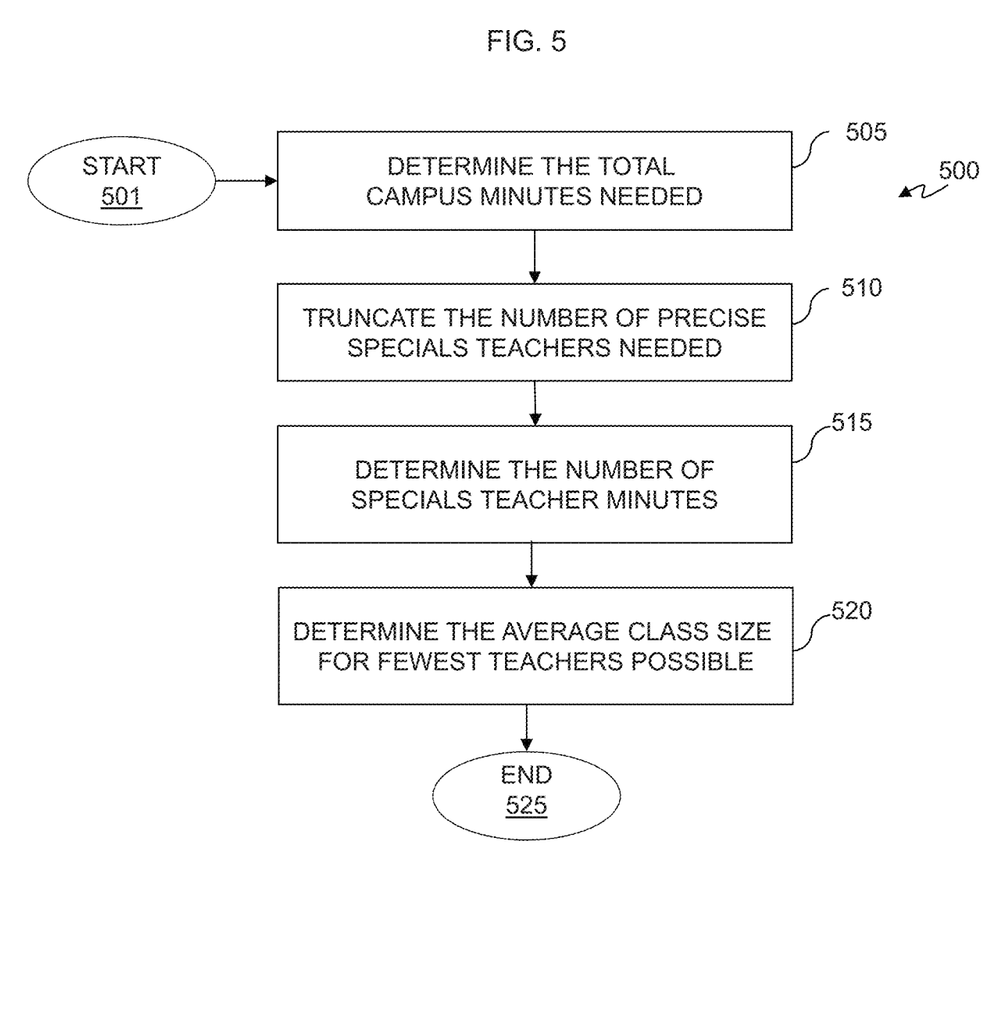
FIG. 5 illustrates a flow diagram of a method for determining the fewest teachers possible with the predicted class size carried out according to principles of the disclosure.

FIG. 5 illustrates a flow diagram of a method 500 for determining the fewest teachers possible with the predicted class size according to principles of the disclosure. The method 500 corresponds to an algorithm that can be executed by a processor, such as processor 236. The method 500 begins at step 501.

In a step 505, the scheduler sums the grade level weekly minutes for each grade to determine the total campus minutes needed.

In a step 510, the number of precise specials teachers needed is truncated. In a step 515, the scheduler determines teacher minutes by multiplying the truncated integer by the number of periods available for students in a day by the number of minutes in each period by the number of days each week a specials teacher is available. The steps 505 through 515 is represented by Equation 5:

$$T_{fewest(truncated\ integer)} \times \text{Periods per week} \times \text{EF} \times \text{available days per week}$$

In a step 520, the scheduler determines the average class size for fewest teachers possible by dividing the total campus minutes by teacher minutes using the truncated integer.

The method ends at step 525.

Figure 6:
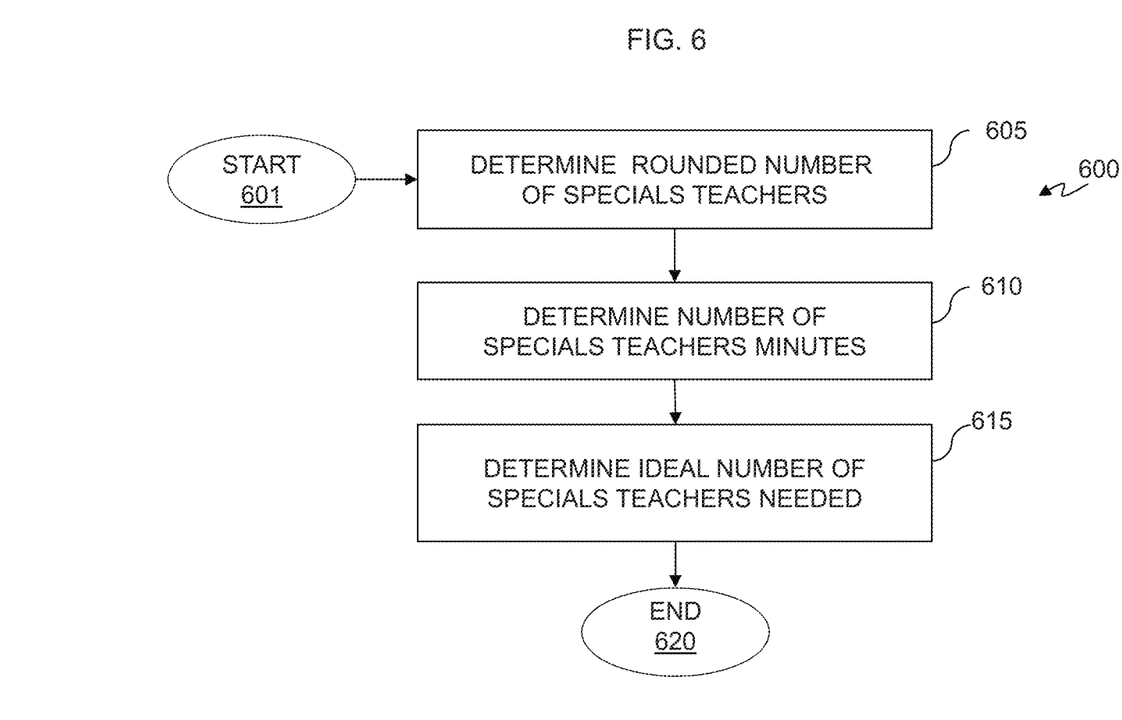
FIG. 6 illustrates a flow diagram of a method for determining an ideal number of teachers necessary with the predicted class size carried out according to principles of the disclosure.

FIG. 6 illustrates a flow diagram of a method 600 for determining an ideal number of teachers necessary with the predicted class size according to principles of the disclosure. The method 600 corresponds to an algorithm that can be executed by a processor, such as processor 236. The method begins at step 601.

In a step 605, the scheduler rounds the precise number of specials teachers needed calculated in method 300 to the next integer. In a step 610, the scheduler determines a number of specials teacher minutes by multiplying the rounded-up integer by the number of periods available for students in a day by the number of minutes in each period by the number of days each week a specials teacher is available. The calculations in steps 605 and 610 are represented by Equation 6:

$$T_{ideal} \times \text{periods per week} \times \text{EF} \times \text{available days per week}$$

In a step 615, the scheduler determines the ideal number of specials teachers needed by dividing the total campus minutes by specials teacher minutes using the rounded-up integer. The method 600 ends in a step 620.

In one embodiment, at least a portion of the methods 300, 400, 500, and 600 can be performed by a computing device or processor as disclosed herein. A computing device may include the necessary logic circuitry to carry out at least a portion of each method. In one embodiment, each method 300, 400, 500, and 600 or at least a portion thereof may be embodied as a series of operating instructions that are stored on a non-transitory computer readable medium and used to direct the operation of a processor when initiated thereby. As indicated below, a staff scheduler as disclosed herein can perform at least some of the steps of the methods 300, 400, 500, and 600.

In some embodiments, when calculating a number of "specials" teachers needed, the user may be able to indicate that teacher aides are available to supplement available certified teacher as one of the district input parameters provided to the scheduler 110. Aides may be shared between core teachers and specials teachers. The number of aides that may be and shared, and used for certain specials classes may vary by district and also vary by certain specials course.

In some embodiments, the staff scheduler 110 may also be able to calculate special education teachers and aides needed for specials. For example, special education students may require enhanced or adaptive physical education, so additional teachers or aides may be required. The user may input a required ratio and/or the external source, such as district management system 105 may also provide inputs on number of students requiring enhanced or adaptive physical education. In other specials, special education students may be factored into the number of enrolled students considered for each grade when calculated specials teachers for courses such as music, art, and library.

Core-teachers for special and enhanced learning are determined by different factors than used for non-enhanced or special learning. As such, different inputs and calculations may be required.

Figure 7:
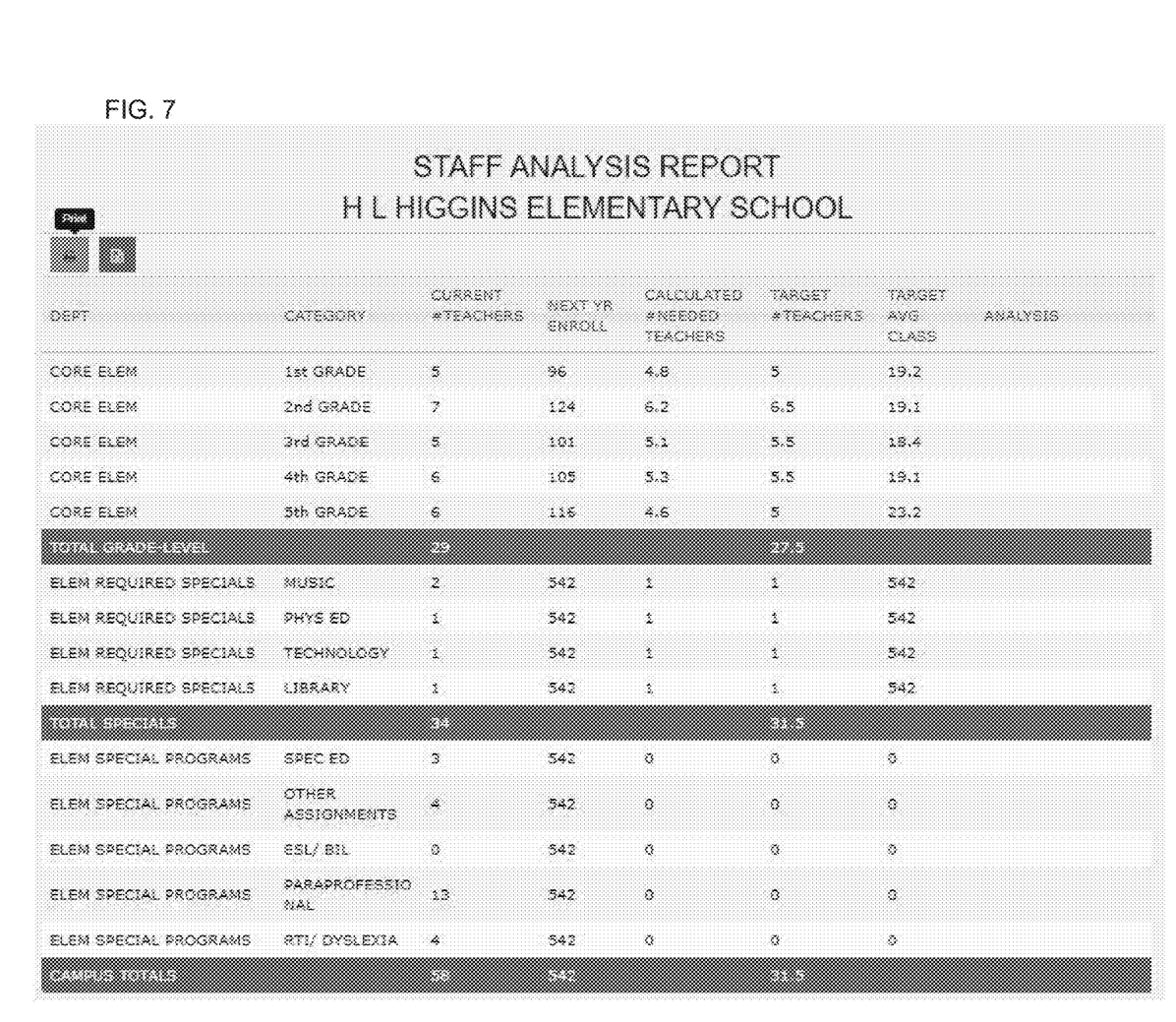
FIG. 7 illustrates an example of a staff schedule report showing analysis for elementary staffing requirements which may be generated by the staff scheduler according to the principles of the disclosure.

FIG. 7 illustrates an example of a staff schedule report showing analysis for elementary staffing requirements which may be generated by the staff scheduler according to the principles of the disclosure. The staff schedule report illustrates one example of providing generated results of a staff schedule to a user, such as an administrator. The schedule report represents a combined report showing, per grade level and per each "specials" course, a current number of teachers, projected enrollment for a next school year, a calculated number of teachers based on the projected enrollment, a target number of teachers, and an average class size. The report, in this embodiment, also shows a number of current teachers and projected enrollment for special programs, such as special education, other assignments, enhanced learning programs such as ESL (English as a Second language), Reading specialists (RTI/Dyslexia), and other paraprofessionals.

The disclosure provides an apparatus, systems, and methods specifically designed to improve the technological area of generating elementary staffing schedules by recognizing the multiple factors, requirements, and conditions to consider for determining the staffing schedule, weighing the plurality of inputs representing the factors, requirements, and conditions, and providing a staffing schedule that satisfies the factors, requirements, and conditions according to the weighted inputs. The disclosed apparatuses, processes, and systems not only provide improved staff schedules for elementary schools, but provide them faster and with less manpower required from school districts. As such, school districts can save administration funds that can be used for the education of students. Additionally, the disclosed methods and systems ensure that the correct specials teachers are available to meet the specific needs of students.

A portion of the above-described apparatus, systems or methods may be embodied in or performed by various, such as conventional, digital data processors or computers, wherein the computers are programmed or store executable programs of sequences of software instructions to perform one or more of the steps of the methods. The software instructions of such programs or code may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

The invention claimed is:

1. A staff scheduler for generating staffing schedules for a plurality of elementary education campuses of a school district, comprising:
   at least one interface for receiving a plurality of inputs from multiple external computing devices; wherein at least a portion of the inputs are automatically received from a school district information management system on a regular periodic basis; and
   a processor configured to periodically perform a staff scheduling algorithm to generate a staffing schedule report for the plurality of elementary education campuses, wherein the staff scheduling algorithm generates a series of input prompts and decisions based on the plurality of inputs, wherein the staff scheduling algorithm is stored on a non-transitory computer readable medium, wherein said periodically performing is at regular and frequent intervals at time,
   wherein the plurality of inputs includes at least student data, teacher data, enrollment data, required minutes of core teaching, and required minutes per specials course;
   wherein at least one special restriction is also periodically evaluated and employed by the processor to determine teaching staffing to be shared by the plurality of elementary education campuses, wherein said periodically evaluated and employed is at regular and frequent intervals at time, wherein said at least one special restriction includes at least one of:
      each specials teacher availability and each specials teacher certifications;
      a desired average specials class size;
      a desired ratio of students per specials teacher per specials class;
      a number of minutes each student must take for a specials class;
      whether a specials teacher is shared with more than one elementary campus of the plurality of elementary education campuses;
      teacher aides available for a specials class; and
      a ratio of students to specials teachers allowed,
   wherein the staff scheduling algorithm includes at least the steps of:
   receiving time data feed at a regular interval, the time data including at least minutes required per students per course and a number of minutes available for a specials teacher per day;
   multiplying a number of core teachers per grade by an enrollment factor by the minutes required per students per course;
   multiplying the number of minutes available for a specials teacher per day by a number of days the specials teacher is available by a specials enrollment factor to calculate a number of specials teacher available weekly minutes;
   dividing a number of minutes per grade level per week by the specials teacher available minutes to calculate a number of specials teachers;
   providing an analysis of calculated needed teachers by rounding the number of specials teachers to the nearest 0.5 integer; and
   periodically generating the staffing schedule report as a visual display for each elementary education campus of the plurality of the elementary education campuses, wherein staffing for each elementary education campus is performed according to the staffing schedule report to satisfy the at least one special restriction that is also periodically evaluated,
   wherein the visual display is presented as a matrix of rows, and columns that include departments, categories, current number of teachers, count of next year students to enroll, a calculated number of needed teachers, a number of target teachers, a target average for a class, and the analysis,
   wherein the rows include highlighted total rows for total grade-level, total specials and campus totals, and
   wherein the analysis, for each of the categories of each of the departments, provides an indication of overstaffing and a count of overstaffing if overstaffing has occurred.

2. The staff scheduler according to claim 1, wherein the multiple external computing devices includes device at least one user interface that receives, data from a user in the school district, wherein the at least one user interface is presented as a web page, and wherein said visual display includes a column denoting the calculated needed teachers.

3. The staff scheduler according to claim 1, wherein the enrollment data includes current enrollment and projected enrollment.

4. The staff scheduler according to claim 1, wherein the teacher data includes available teacher minutes per week, current numbers of teachers on staff at the at least one elementary education campus, and certifications for each teacher.

5. The staff scheduler according to claim 1, wherein the staffing schedule report includes at least for each grade level: a current number of core teachers per grade level, a calculated number of core teachers needed, a target number of core teachers, and a target average class size.

6. The staff scheduler according to claim 1, wherein the staffing schedule report further includes at least for each specials course: a current number of specials teachers per campus, a calculated number of specials teachers needed, a target number of specials teachers, and a target average class size.

7. The staff scheduler according to claim 1, wherein the plurality of inputs further includes state required student to teacher ratios for each course and maximum class size.

8. A staff scheduling system for generating staffing schedules for a plurality of elementary education campuses of a school district, comprising:
   a staff scheduler configured to generate a staffing schedule report; and
   multiple external computing devices configured to supply course and teacher data to the staff scheduler for the staffing schedule report,
   wherein the staff scheduler includes:
      at least one interface for receiving a plurality of inputs from the multiple external computing devices; wherein at least a portion of the inputs are automatically received from a school district information management system on a regular periodic basis; and
      a processor configured to periodically execute a staff scheduling algorithm and prepare based thereon the staffing schedule report for the plurality of elementary education campuses, wherein the staff scheduling algorithm generates a series of input prompts and decisions based on the plurality of inputs, wherein said periodically executing is at regular and frequent intervals at time;
wherein the plurality of inputs includes at least student data, teacher data, enrollment data, required minutes of core teaching, and required minutes per specials course;
wherein at least one special restriction is also periodically evaluated and employed by the processor to determine teaching staffing to be shared by multiple campuses, wherein said periodically evaluated and employed is at regular and frequent intervals at time, wherein said at least one special restriction includes at least one of:
each specials teacher availability and each specials teacher certifications;
a desired average specials class size;
a desired ratio of students per specials teacher per specials class;
a number of minutes each student must take for a specials class;
whether a specials teachers is shared with more than one elementary education campus of the plurality of said elementary education campuses;
teacher aides available for a specials class; and
a ratio of students to specials teachers allowed,
wherein the staff scheduling algorithm includes at least the steps of:
receiving time data feed at a regular interval, the time data including at least minutes required per students per course and a number of minutes available for a specials teacher per day;
multiplying a number of core teachers per grade by an enrollment factor by the minutes required per students per course;
multiplying the number of minutes available for a specials teacher per day by a number of days the specials teacher is available by a specials enrollment factor to calculate a number of specials teacher available weekly minutes;
dividing a number of minutes per grade level per week by the specials teacher available minutes to calculate a number of specials teachers;
providing an analysis of calculated needed teachers by rounding the number of specials teachers to the nearest 0.5 integer; and
periodically generating at least a portion of the staffing schedule report as a visual display for each elementary education campus of the plurality of the elementary education campuses, wherein staffing for each elementary education campus is performed according to the staffing schedule report to satisfy the at least one special restriction that is also periodically evaluated,
wherein the visual display is presented as a matrix of rows, and columns that include departments, categories, current number of teachers, count of next year students to enroll, a calculated number of needed teachers, a number of target teachers, a target average for a class, and the analysis,
wherein the rows include highlighted total rows for total grade-level, total specials and campus totals, and
wherein the analysis, for each of the categories of each of the departments, provides an indication of overstaffing and a count of overstaffing if overstaffing has occurred.

9. The staff scheduling system according to claim 8, wherein the multiple external computing devices include at least one user interface that receives data from a user in the school district, wherein the at least one interface is presented as a web page, and wherein said visual display includes a column denoting the calculated needed teachers.

10. The staff scheduling system according to claim 8, wherein the enrollment data includes current enrollment and projected enrollment.

11. The staff scheduling system according to claim 8, wherein the teacher data includes available teacher minutes per week, current numbers of teachers on staff at the elementary education campus, and certifications for each teacher.

12. The staff scheduling system according to claim 8, wherein the staffing schedule report includes at least for each grade level: a current number of core teachers per grade level, a calculated number of core teachers needed, a target number of core teachers, and a target average class size.

13. The staff scheduling system according to claim 8, wherein the staffing schedule report further includes at least for each specials course: a current number of teachers per campus, a calculated number of core teachers needed, a target number of teachers, and a target average class size.

14. The staff scheduling system according to claim 8, wherein the plurality of inputs further includes state required student to teacher ratios for each course, required hours per course, and maximum class size.

15. A method for preparing a staffing schedule report for a plurality of elementary education campuses of a school district, the method comprising:
automatically receiving data for the elementary education campus from multiple external sources, the data including at least student data, teacher data, enrollment data, required minutes of core teaching, and required minutes per specials course; and
preparing a staffing schedule report for the elementary education campus using the received data,
wherein the preparing the staffing schedule report is periodically performed by a processor and satisfies conditions indicated by the received data, wherein said periodically performed is at regular and frequent intervals at time,
wherein at least one special restriction is also periodically evaluated and employed by the processor to determine teaching staffing to be shared by multiple campuses, wherein said periodically evaluated and employed is at regular and frequent intervals at time,
wherein said at least one special restriction includes at least one of:
each specials teacher availability and each specials teacher certifications;
a desired average specials class size;
a desired ratio of students per specials teacher per specials class;
a number of minutes each student must take for a specials class;
whether a specials teachers is shared with more than one elementary education campus of the plurality of elementary education campuses;
teacher aides available for a specials class; and
a ratio of students to specials teachers allowed,
wherein preparing the staffing schedule includes at least the steps of:
receiving time data feed at a regular interval, the time data including at least minutes required per students per course and a number of minutes available for a specials teacher per day;

multiplying a number of core teachers per grade by an enrollment factor by the minutes required per students per course;

multiplying the number of minutes available for a specials teacher per day by a number of days the specials teacher is available by a specials enrollment factor to calculate a number of specials teacher available weekly minutes;

dividing a number of minutes per grade level per week by the specials teacher available minutes to calculate a number of specials teachers;

providing an analysis of calculated needed teachers by rounding the number of specials teachers to the nearest 0.5 integer; and periodically generating the staffing schedule report for each of the elementary education campuses of the plurality of elementary education campuses, wherein staffing for each elementary education campus is performed according to the staffing schedule report to satisfy the at least one special restriction that is also periodically evaluated, wherein the visual display is presented as a matrix of rows, and columns that include departments, categories, current number of teachers, count of next year students to enroll, a calculated number of needed teachers, a number of target teachers, a target average for a class, and the analysis, wherein the rows include highlighted total rows for total grade-level, total specials and campus totals, and wherein the analysis, for each of the categories of each of the departments, provides an indication of overstaffing and a count of overstaffing if overstaffing has occurred.

16. The method for preparing a staffing schedule report according to claim 15, wherein the multiple external sources include at least one user interface that receives data from a user in the school district, wherein the at least one user interface is presented as a web page, and wherein said visual display includes a column denoting the calculated needed teachers.

17. The method for preparing a staffing schedule report according to claim 15, wherein the enrollment data includes current enrollment and projected enrollment.

18. The method for preparing a staffing schedule report according to claim 15, wherein the teacher data includes available teacher minutes per week, current numbers of teachers on staff at the elementary education campus, and certifications for each teacher.

19. The method for preparing a staffing schedule report according to claim 15, wherein the staffing schedule report further includes at least for each specials course: a current number of teachers per campus, a calculated number of core teachers needed, a target number of teachers, and a target average class size.

* * * * *

UNITED STATES PATENT AND TRADEMARK OFFICE
CERTIFICATE OF CORRECTION

PATENT NO. : 10,692,026 B2
APPLICATION NO. : 16/041358
DATED : June 23, 2020
INVENTOR(S) : J. Eli Crow, Kenneth L. Sikes and Shawn M. Rasure Page 1 of 1

It is certified that error appears in the above-identified patent and that said Letters Patent is hereby corrected as shown below:

In the Claims

In Column 12, Line 21, Claim 2, after --devices includes-- delete "device"

In Column 12, Line 22, Claim 2, after --that receives-- delete ","

Signed and Sealed this
First Day of September, 2020

Andrei Iancu
*Director of the United States Patent and Trademark Office*